W. A. SCHMIDT.
PROCESS AND APPARATUS FOR SEPARATING FINELY DIVIDED MATERIALS.
APPLICATION FILED OCT. 17, 1916.
1,298,409.
Patented Mar. 25, 1919.
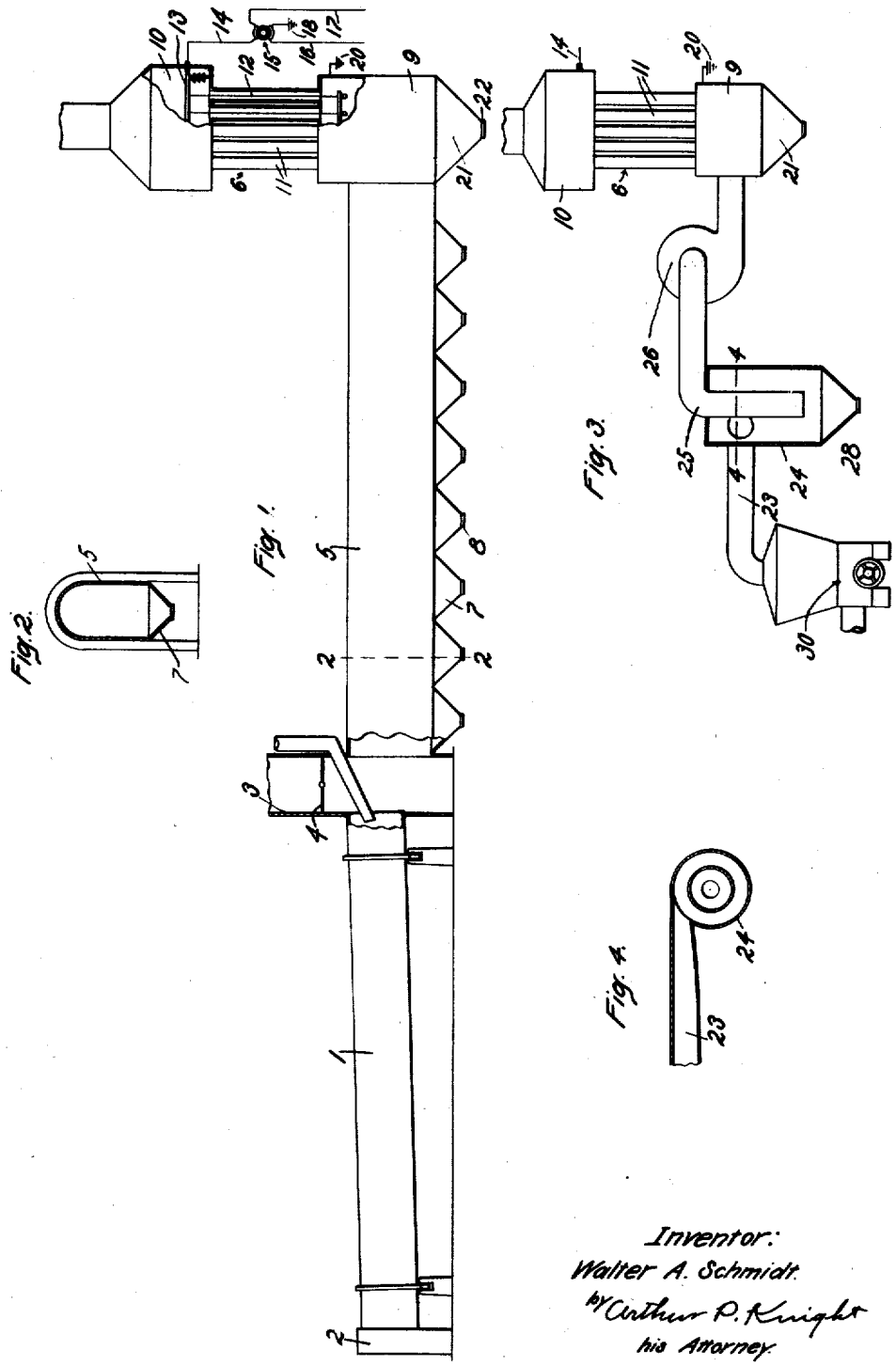
Inventor:
Walter A. Schmidt
by Arthur P. Knight
his Attorney

UNITED STATES PATENT OFFICE.

WALTER A. SCHMIDT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS AND APPARATUS FOR SEPARATING FINELY-DIVIDED MATERIALS.

1,298,409.      Specification of Letters Patent.      Patented Mar. 25, 1919.

Application filed October 17, 1916. Serial No. 126,080.

*To all whom it may concern:*

Be it known that I, WALTER A. SCHMIDT, a citizen of the United States, residing at Los Angeles, in the county of Los Angeles and State of California, have invented a new and useful Process and Apparatus for Separating Finely-Divided Materials, of which the following is a specification.

This invention relates particularly to a process and apparatus for selectively separating from a gas, particles of different size or of different material suspended therein, such gas being for example the effluent of kilns or furnaces containing dust or fume. The invention also provides for separation of particles of different degrees of fineness which are present in a state of mixture, and which it is desirable to separate or selectively recover according to size or fineness.

The main object of the present invention is to selectively collect or separate the particles of different degrees of fineness in such manner that both the coarser and the finer particles are effectively precipitated. For collection or precipitation of comparatively coarse particles, mechanical separators, such as settling chambers or centrifugal separators, are effective, but they are not effective in the precipitation or collection of very fine dust or fume. My present invention provides for collection or precipitation of the coarser particles by such mechanical action, followed by the action of more efficient precipitating means, namely,—the action of an electric field, which is capable of precipitating the finest particles, with comparative rapidity.

On account of the extreme rapidity and efficiency of electric precipitation there is a tendency, when the precipitation is effected wholly by electrical action, for an appreciable portion of the finer particles to be precipitated along with the coarser particles throughout the precipitating action, although by carrying out the precipitating action successively in different parts of the apparatus, under proper conditions, a selective precipitation or separation can be effected, as disclosed in my Patent No. 1,200,887 issued Oct. 10, 1916, for process of obtaining alkali metal compound. Inasmuch however, as the mechanical precipitation action, whether by settling or by centrifugal action, is quite effective on coarse material and almost ineffective on very fine dust, the two stage precipitation with initial action by mechanical precipitation, followed by electrical precipitation, gives a cleaner separation than is otherwise possible, the coarser material being almost wholly precipitated by mechanical action and the finer dust being almost wholly precipitated by the electrical action.

It will be understood that in case there are present in the suspended material particles which are of a flocculent or porous nature, they will possess a buoyancy comparable to that of smaller compact particles, so that the process is applicable generally to separation of particles of different buoyancy, whether such buoyancy be due to the relatively small size of the particles or to relatively small density thereof.

This process is hereafter described as applied in connection with a rotary kiln for burning cement mix containing a small proportion of potassium compound, which passes over in the effluent gases and forms an extremely fine dust which, by this process, can be precipitated separately from the coarser dust passing over therewith. As so applied, this process provides for separate recovery of such potassium compound in a state of sufficient concentration to be commercially valuable.

The accompanying drawings illustrate apparatus suitable for carrying out my invention, and referring thereto—

Figure 1— is a side elevation partly in section of one form of such apparatus.

Fig. 2— is a transverse section on line 2—2, in Fig. 1.

Fig. 3— is a partly sectional elevation of another form of the apparatus.

Fig 4— is a section on line 4—4 in Fig. 3.

Referring to Figs. 1 and 2, the apparatus therein shown is adapted for use in connection with a cement burning kiln, indicated at 1, said kiln being of the usual rotary type and provided with a hood or burner means 2 at its lower end and communicating at its upper end with the usual stack 3. A damper 4, is provided in said stack for diverting the flow of gases through the precipitating devices hereinafter described. From the stack 4, a conduit or elongated chamber 5 extends, for example,—in a horizontal direction, and communicates at its farther end with an electrical precipitator indicated at 6. Said chamber 5 operates as a cooling chamber and also as a mechanical precipitating means or settling chamber and is provided at its bottom with hoppers or bins 7, in which the material settles or accumulates, said hoppers or bins being provided with means, such as gates 8, for drawing off material therefrom. The cross sectional area of this conduit or chamber 5, is preferably considerably in excess of that of the interior of the rotary kiln 1, so that the gas will pass through said conduit or chamber with sufficiently low velocity to enable the coarser particles carried thereby or suspended therein to settle out or precipitate by the action of gravity.

The electrical precipitator 6, may be of any suitable type, comprising, for example, the lower header 9 into which the conduit 5 opens; an upper header 10; vertical pipes or flues 11, connecting said upper and lower headers and constituting collecting electrodes; and discharge electrodes 12, formed for example as wires, extending axially in the respective pipes or flues 11, and hung from an insulated support 13. Said insulated support 13 may be connected by wire 14 to rectifier 15, having supply connections 16 and 17 to a high tension alternating circuit, said rectifier having also a ground connection 18, and the collecting electrodes 11 of the precipitator being also grounded as indicated at 20, to complete the electric circuit connection. The upper header 10 may communicate with a stack or other means for carrying away the cleaned gas. Bins or dust receiving means 21, are provided at the bottom of lower header 9, and are provided with means 22 for removing or discharging the dust continuously or from time to time.

My process is carried out in connection with the burning of a Portland cement mixture in the above described apparatus as follows:
In the operation of the rotary kiln 1, the gases passing therefrom into the stack 3 contain a considerable quantity of dust. When the silicious constituent of the cement mixture contains an appreciable percentage of potassium, the effect of the heat in the clinkering operation causes volatilization of a large portion of potassium compound, derived from such constituent, and an important object of the present invention in such cases is to obtain a product containing such potassium compound in sufficient proportion to render it commercially valuable. In the regular operation of the apparatus the damper 4 is closed and the gases coming from the kiln are forced to pass by natural draft or otherwise through the conduit or chamber 5 and the precipitator 6, wherein they are cooled more or less, so that during the time the gases traverse the apparatus and before
they are discharged therefrom, the vola-
tilized potassium compound derived from the mixture is wholly or largely condensed so as to form a cloud of suspended particles in the gas. The gas also contains a considerable quantity of other solid particles or dust, mechanically blown out of the kiln, which are, however, in general, much coarser or larger in size than the particles resulting from condensation of the potassium compound. These coarser or larger particles settle to a large extent in passing through the conduit chamber 5 and are collected in the bins 7, from which they may be withdrawn, either continuously or from time to time, by suitable means, and may be returned to the kiln or otherwise utilized. The gas passing from the conduit 5 to the electrical precipitator 6 contains only very finely divided material consisting largely of potassium compound and also including the finer particles of dust blown over from the kiln, and in passing through the precipitator, this gas is subjected to electrical action by maintaining a high potential difference between the discharge electrodes 12 and the collecting electrodes 11, by operation of the high tension direct current supplied through the rectifier, from the alternating current supply circuit. The fine particles, including the potassium compound, are deposited on the collecting electrodes 11, and, if necessary, are shaken off from time to time by suitable means, not shown, and collected in the bins 21 at the bottom of the lower header 9, from which the collected material may be removed, either continuously or from time to time. This collected material contains an amount of potassium compound which is many times that contained in the product collected in the mechanical separator bins 7.

My process may also be applied in connection with centrifugal separation, and in that case, the apparatus shown in Figs. 3 and 4 may be used, the pipe 23 for supplying the dust carrying gas leading to a "cyclone" dust separator 24, whose outlet 25 is connected to a blower 26, which discharges into the lower header 9 of the electric precipitator 6. The dust carrying gas may be drawn from any furnace, mill or other apparatus producing dust of different degrees of fineness. In this case the operation of the cyclone dust separator causes the heavier and larger particles suspended in the gas to be collected in the bin or hopper 28 thereof, while the finer particles containing, for example, the potassium compounds, (mentioned above in connection with the application of the process to a cement kiln,) are passed on to the electrical precipitator 6, wherein they are precipitated.

An important application of my invention, as illustrated in Fig. 3, is in connection with grinding or crushing mills for the purpose of removing the finely ground material from the coarser material in the mill so as to maintain full efficiency of the mill in grinding the coarser material, and at the same time separating the dust from the remainder of the product so removed. For this purpose the pipe 23 leading to the cyclone separator 24 may be connected to a mill indicated at 30, to draw therefrom the ground material as fast as it is ground to proper size. The gas or air containing the suspended material so drawn over through pipe 23 is subjected to mechanical separating action in cyclone separator 24 (or in a gravitative settling chamber, if desired) and the gas is then passed through the electrical precipitator to collect the finer material or dust. The coarser and finer particles being separately collected in this manner, may be separately utilized, or if only the finer product is desired, the coarser product may be returned for regrinding. With this operation, none of the finely ground material or dust drawn off from the mill by the air current, is returned to the mill so that the cushioning or clogging effect due to dust in the mill and interfering with effective grinding is wholly eliminated, and maximum efficiency of grinding is maintained.

The process as above described is applicable in connection with the recovery of any alkali metal compound from a silicate rock in connection with a cement process, or any other case where lime is present, so as to liberate the potassium compound or other alkali metal compound. The process is also applicable for separation of ore constituents, passing off as dust and fume from smelters and the like, the coarser particles being caught by the mechanical separator, and the finer particles or fume being collected by the electrical precipitating action. In such cases, as well as in the case of cement dust, the selection as to size effected by this process may also result in a selective separation as to chemical constitution, particularly in cases where the fume precipitated by the electrical action results from condensation of metallic or other vapors passing over with the coarser dust, in the smelter flue-gases.

The above described process of selective separation may also be applied in any case where particles of different size or density are suspended in a gas, and it may even be applied with advantage to the separation of constituents of different fineness or density, contained in aggregates, such as culm piles, tailings or the like, the solid particles of such aggregates being brought into suspension in the gas in any suitable manner and the gas being then subjected to successive mechanical and electrical separating actions as above described.

In some cases, there may be a difference in density of the particles, resulting in a difference in buoyancy, and in such cases, the less buoyant particles are caused to settle by gravity in the settling chamber or otherwise mechanically separated as above described and the more buoyant particles are carried through the mechanical separators and precipitated by electrical action.

The term "mechanical separation" or "mechanical precipitation", as herein used, applies to any operation in which dust is separated or precipitated by the action of gravity, centrifugal force or other non-electrical force, and the term "electrical precipitation" applies to any operation in which dust is separated or precipitated by the action of an electrical field maintained between electrodes by the production at such electrodes of a high potential difference, either direct or alternating and either continuous or intermittent.

What I claim is:

1. The process of selectively separating and collecting material suspended in a gas which consists in causing a stream of such gas to flow at such velocity that coarser particles are separated therefrom by the mechanical action of a force dependent on the mass of the particles, and then subjecting said gas current, containing the remaining particles, in continued flow to the action of an electric field to precipitate the finer particles therefrom.

2. The process of selectively separating and collecting material suspended in a gas which consists in causing a stream of such gas to move in an unobstructed flow at such velocity that coarser particles are separated therefrom by the mechanical action of a force dependent on the mass of the particles, and then subjecting said gas current, containing the remaining particles, in continued flow to the action of an electric field to precipitate the finer particles therefrom.

3. An apparatus for selectively separating materials from a current of gas in which they are suspended comprising a settling chamber, means for passing the gases through the settling chamber at such velocity that the coarser particles carried thereby will settle by gravity in said chamber, a continuous-flow electrical precipitator connected to receive the gas from said settling chamber and adapted to precipitate the finer particles therefrom, and an exit flue from said precipitator.

4. An apparatus for selectively separating materials from a current of gas in which they are suspended comprising a settling chamber having an unobstructed passage therethrough, means for passing the gases through the settling chamber at such velocity that the coarser particles carried thereby will settle by gravity in said chamber, a continuous-flow electrical precipitator connected to receive the gas from said settling chamber and adapted to precipitate the finer particles therefrom, and an exit flue from said precipitator.

5. An apparatus comprising a furnace, a settling chamber connected to the exit of said furnace, means for passing the exit gases through the settling chamber at such velocity that the coarser particles carried by the gas will settle by gravity in said chamber, a continuous-flow electrical precipitator connected to receive the gas from said settling chamber and adapted to precipitate the finer particles therefrom, and an exit flue from said precipitator.

6. An apparatus comprising a furnace, a settling chamber having an unobstructed passage therethrough connected to the exit of said furnace, means for passing the exit gases through the settling chamber at such velocity that the coarser particles carried by the gas will settle by gravity in said chamber, a continuous-flow electrical precipitator connected to receive the gas from said settling chamber and adapted to precipitate the finer particles therefrom, and an exit flue from said precipitator.

In testimony whereof I have hereunto set my hand, at Los Angeles, California, this 9th day of October, 1916.

WALTER A. SCHMIDT.

It is hereby certified that in Letters Patent No. 1,298,409, granted March 25, 1919, upon the application of Walter A. Schmidt, of Los Angeles, California, for an improvement in "Processes and Apparatus for Separating Finely-Divided Materials," an error appears in the printed specification requiring correction as follows: Page 3, line 78, after the word "force" insert the words *dependent on the mass of the particles;* and that the said Letters Patent should be read with this correction therein that the same may conform to the record of the case in the Patent Office.

Signed and sealed this 11th day of November, A. D., 1919.

[SEAL.]

M. H. COULSTON,

*Acting Commissioner of Patents.*

Cl. 183—114.